United States Patent
Kukulski et al.

(10) Patent No.: US 9,035,953 B1
(45) Date of Patent: May 19, 2015

(54) SYSTEMS AND METHODS FOR COMPUTER-ASSISTED DRAWINGS

(75) Inventors: Timothy Kukulski, Oakland, CA (US); Phil Clevenger, San Francisco, CA (US); Phil Lu, Burlingame, CA (US); David Alonzo, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 364 days.

(21) Appl. No.: 13/524,787

(22) Filed: Jun. 15, 2012

(51) Int. Cl.
*G06T 11/20* (2006.01)

(52) U.S. Cl.
CPC .................................. *G06T 11/203* (2013.01)

(58) Field of Classification Search
CPC ................. G06T 11/20; G06T 11/203; G06F 17/50–17/5095
USPC ........................................................ 345/651
See application file for complete search history.

(56) References Cited

U.S. PATENT DOCUMENTS

| | | | | |
|---|---|---|---|---|
| 2007/0146389 A1* | 6/2007 | Distler | ............................ | 345/629 |
| 2009/0210817 A1* | 8/2009 | Schmieder et al. | ............ | 715/781 |
| 2013/0127836 A1* | 5/2013 | Joshi et al. | ..................... | 345/419 |

OTHER PUBLICATIONS

Schweikardt et al., "Digital Clay: Deriving Digital Models from Freehand Sketches," 1998, ACADIA: Association for Computer-Aided Design in Architecture, Quebec City, Canada, p. 202-211.*

Tolba et al., "Sketching with Projective 2D Strokes," 1999, Proceedings of the 12$^{th}$ Annual ACM Symposium on User Interface Software and Technology, p. 149-157.*

Chen et al., "Sketching Reality: Realistic Interpretation of Architectural Designs," 2008, ACM Transactions on Graphics, vol. 27, Issue 2, Article No. 11.*

Company et al., "An optimisation-based reconstruction engine for 3D modelling by sketching," 2004, Computers & Graphics 28, p. 955-979.*

Luh, Ding-Bang, and Shao-Nung Chen. "CAI platform for fundamental geometric training on perspective sketching." Springer Berlin Heidelberg, 2011. Human-Computer Interaction. Users and Applications. pp. 86-92.*

Naya, Ferran, Manuel Contero, and Nuria Aleixos. "ParSketch: a sketch-based interface for a 2D parametric geometry editor." Springer Berlin Heidelberg, 2007. Human-Computer Interaction. Interaction Platforms and Techniques. pp. 115-124.*

* cited by examiner

*Primary Examiner* — Kee M Tung
*Assistant Examiner* — Ryan D McCulley
(74) *Attorney, Agent, or Firm* — Kilpatrick Townsend & Stockton LLP

(57) ABSTRACT

Systems and methods for computer-assisted drawing are disclosed. For example, one disclosed method includes the steps of determining a perspective based on at least one perspective point; receiving a sketch drawing input and generating a sketch line segment based on the drawing input; determining a conformance of the sketch line segment to the perspective; and responsive to determining the conformance exceeds a threshold: adjusting the sketch line segment based on the conformance, and displaying the adjusted sketch line segment.

21 Claims, 18 Drawing Sheets

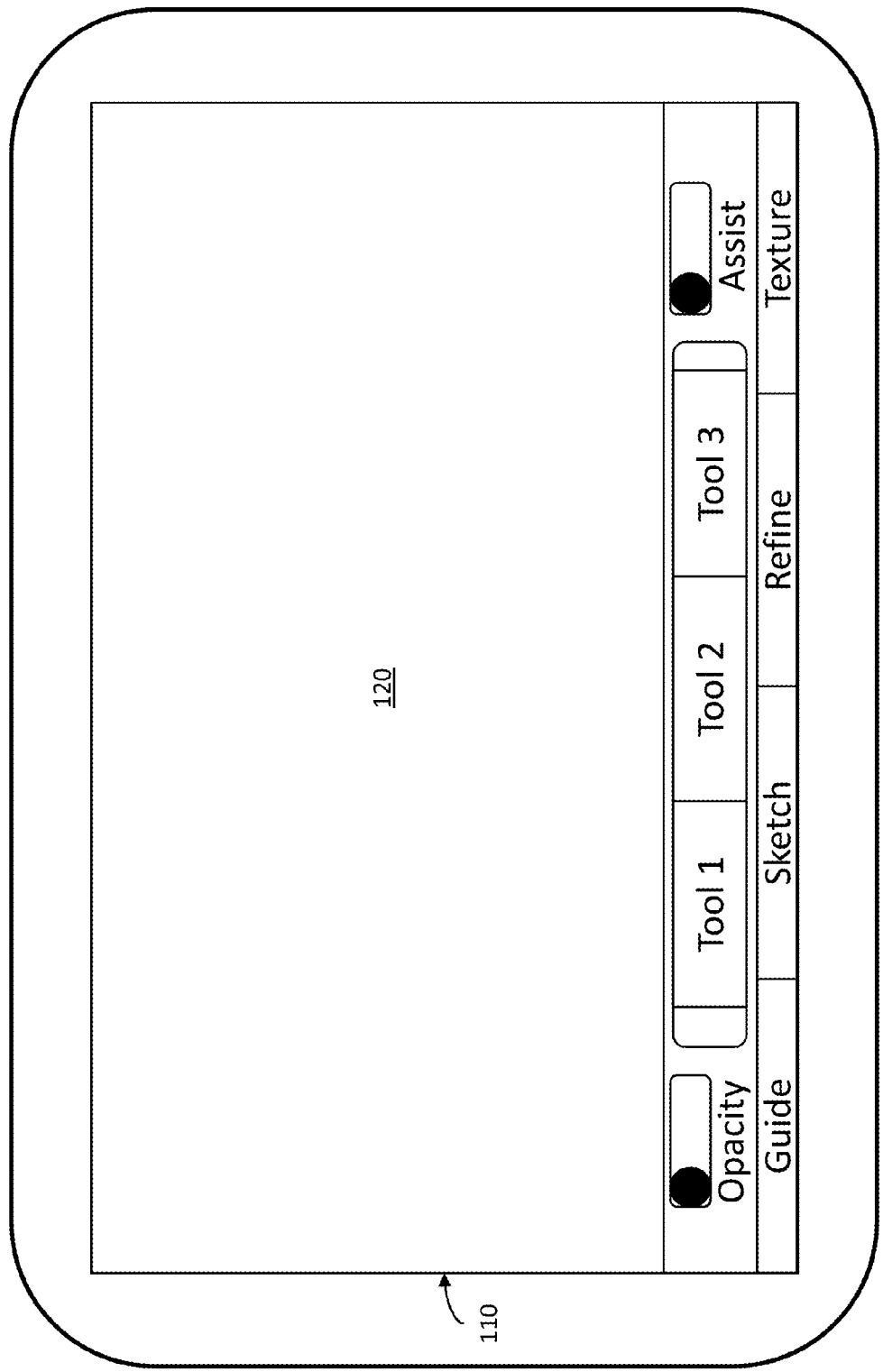

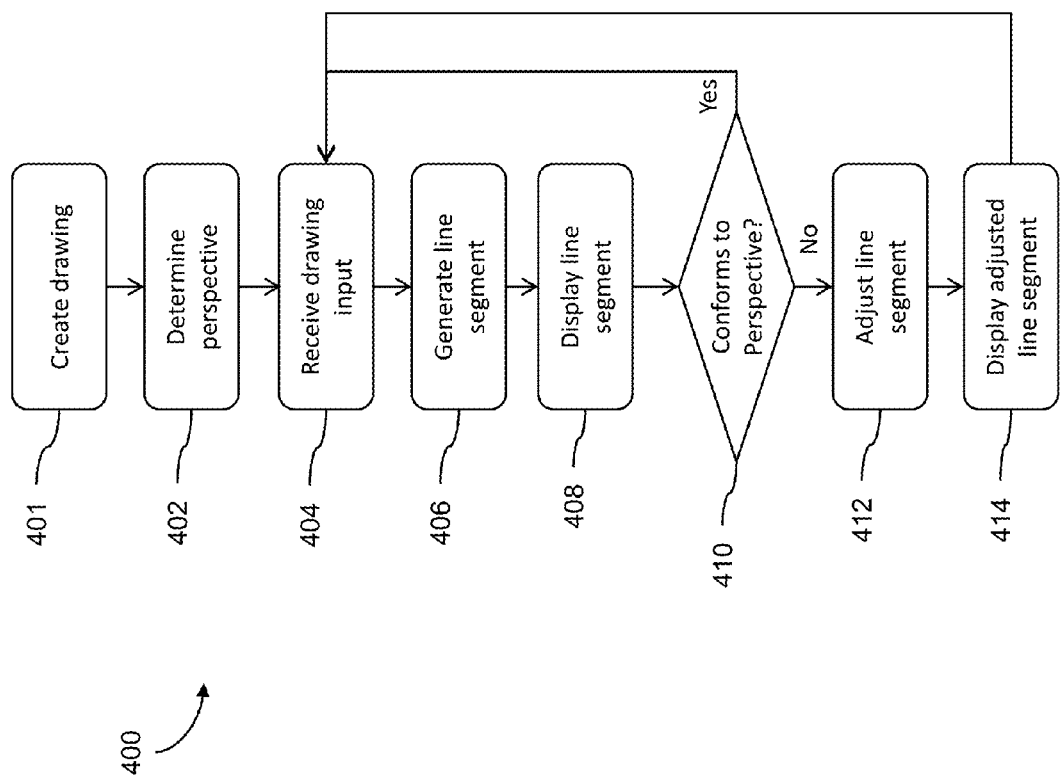

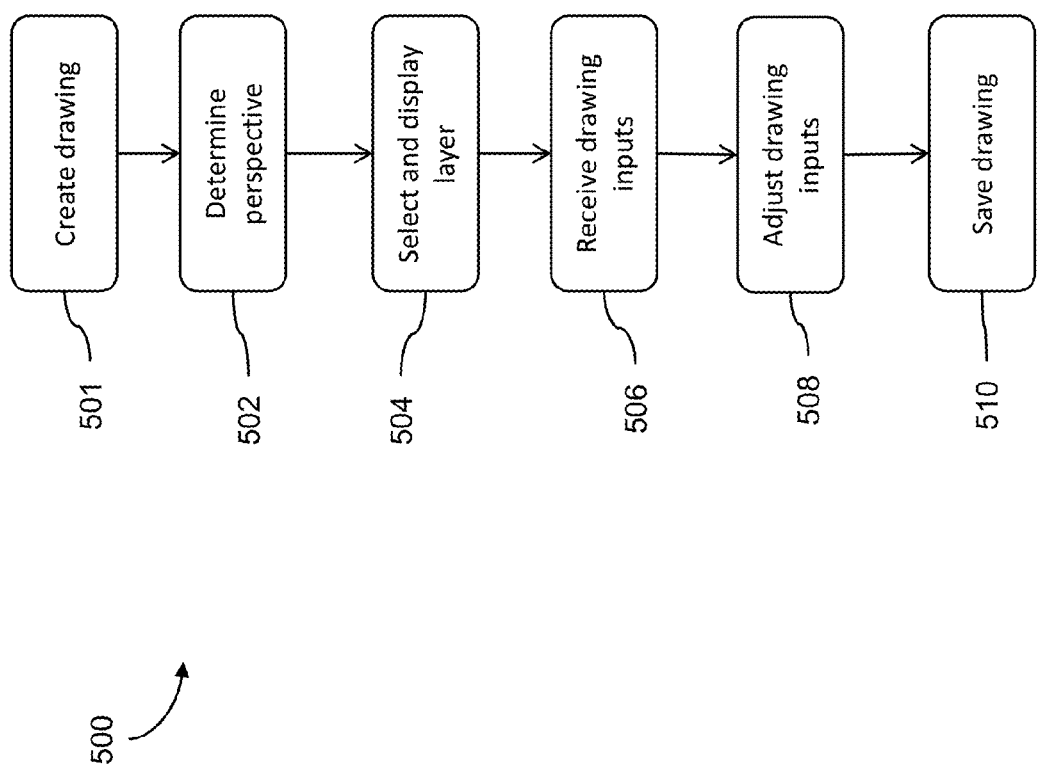

SYSTEMS AND METHODS FOR COMPUTER-ASSISTED DRAWINGS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever:

FIELD

The present application generally relates to electronic drawing and more specifically relates to computer-assisted drawing.

BACKGROUND

A number of computer-implemented drawing programs are available that allow a person to create and save graphical images. For example, Microsoft® Paint® is a widely-distributed basic drawing program that provides a few standard drawing tools for users to create images, such as freehand tools, line and shape tools, and fill tools. In addition, more advanced image-creation programs are available for advanced image editors, such as Adobe® Photoshop®, that provide advanced image editing tools, such as filtering, cropping, bitmap and vector layer editing, and shadowing.

SUMMARY

Embodiments according to the present disclosure provide systems and methods for computer-assisted drawing. For example, one disclosed embodiment is a method comprising determining a perspective based on at least one perspective point, receiving a sketch drawing input and generating a sketch line segment based on the drawing input, determining a conformance of the sketch line segment to the perspective, adjusting the sketch line segment based on the conformance, and displaying the adjusted sketch line segment. In another embodiment, a computer-readable medium comprises program code for causing one or more processors to execute such a method.

These illustrative embodiments are mentioned not to limit or define the disclosure, but rather to provide examples to aid understanding thereof. Illustrative embodiments are discussed in the Detailed Description, which provides further description of the disclosure. Advantages offered by various embodiments of this disclosure may be further understood by examining this specification

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIGS. 1A-G show an illustrative system for computer-assisted drawing according to one embodiment;

FIGS. 4-5 shows illustrative methods for computer-assisted drawing according to various embodiments.

DETAILED DESCRIPTION

Figure 1B:
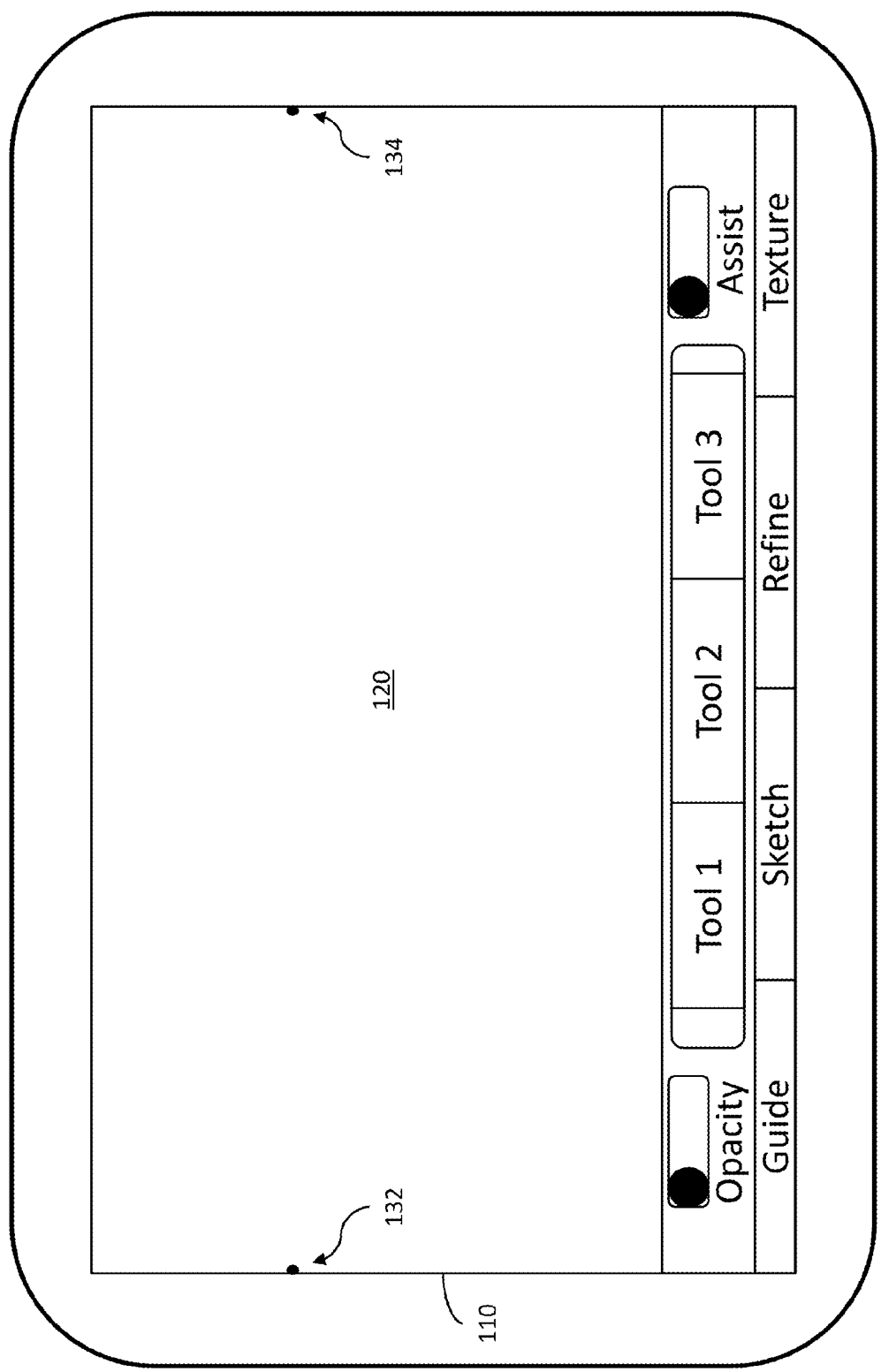
Figure 1C:
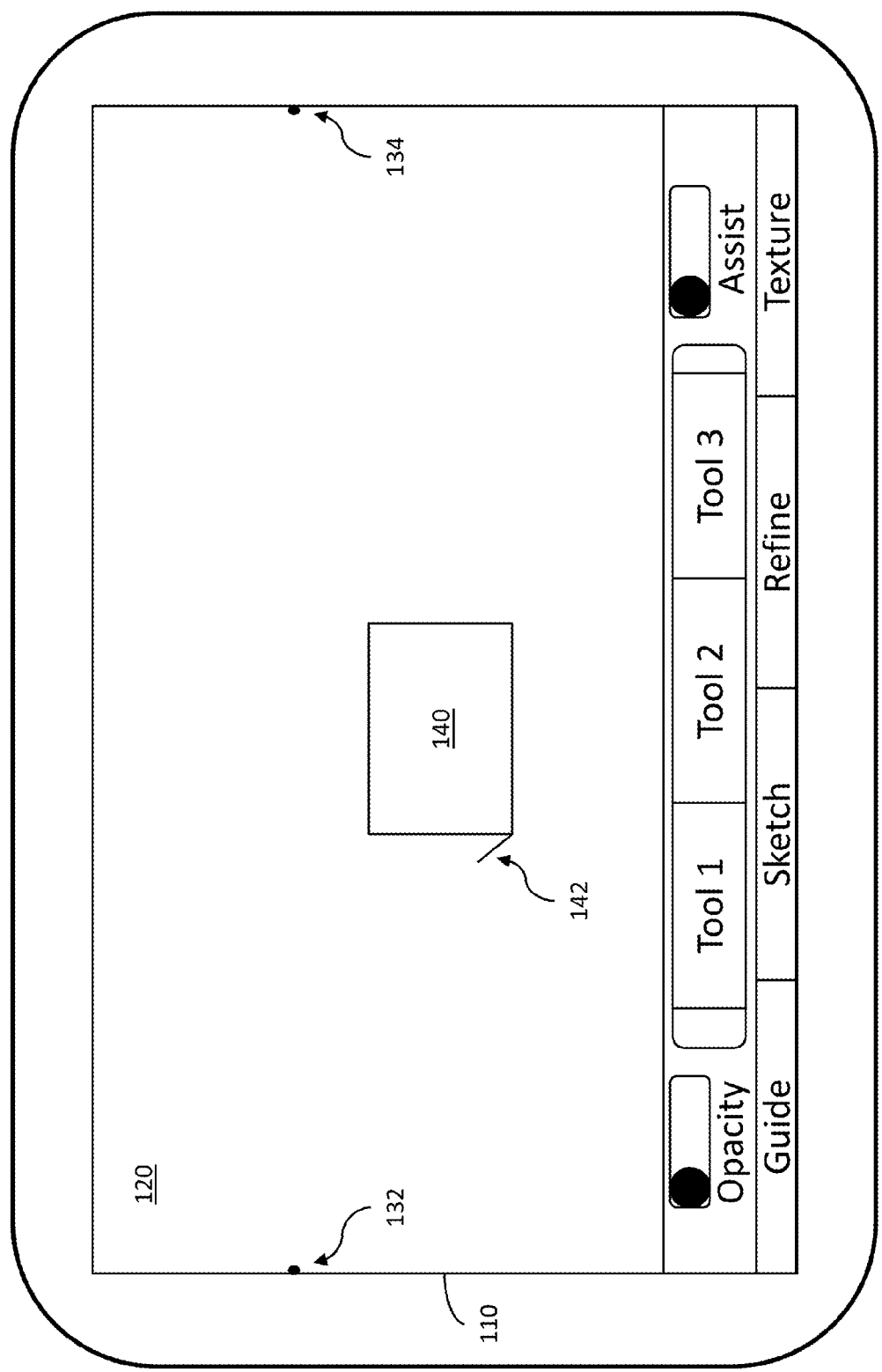

Example embodiments are described herein in the context of systems and methods for computer-assisted drawing. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

Illustrative Method for Computer-Assisted Drawing

In one illustrative method for computer-assisted drawing, a user executes a computer-assisted drawing application as may be seen in FIGS. 1A-G on a tablet computer 100 and is presented with a graphical user interface (GUI) 110 that has a drawing area 120 and a number of drawing options and tools. In this embodiment, the user begins with a blank drawing area 120. The user begins the drawing process by setting a perspective for a new drawing by selecting two points 132, 134 at either edge of the drawing area. Note that in this embodiment, the perspective points are not displayed but are shown here for illustrative purposes.

Figure 1D:
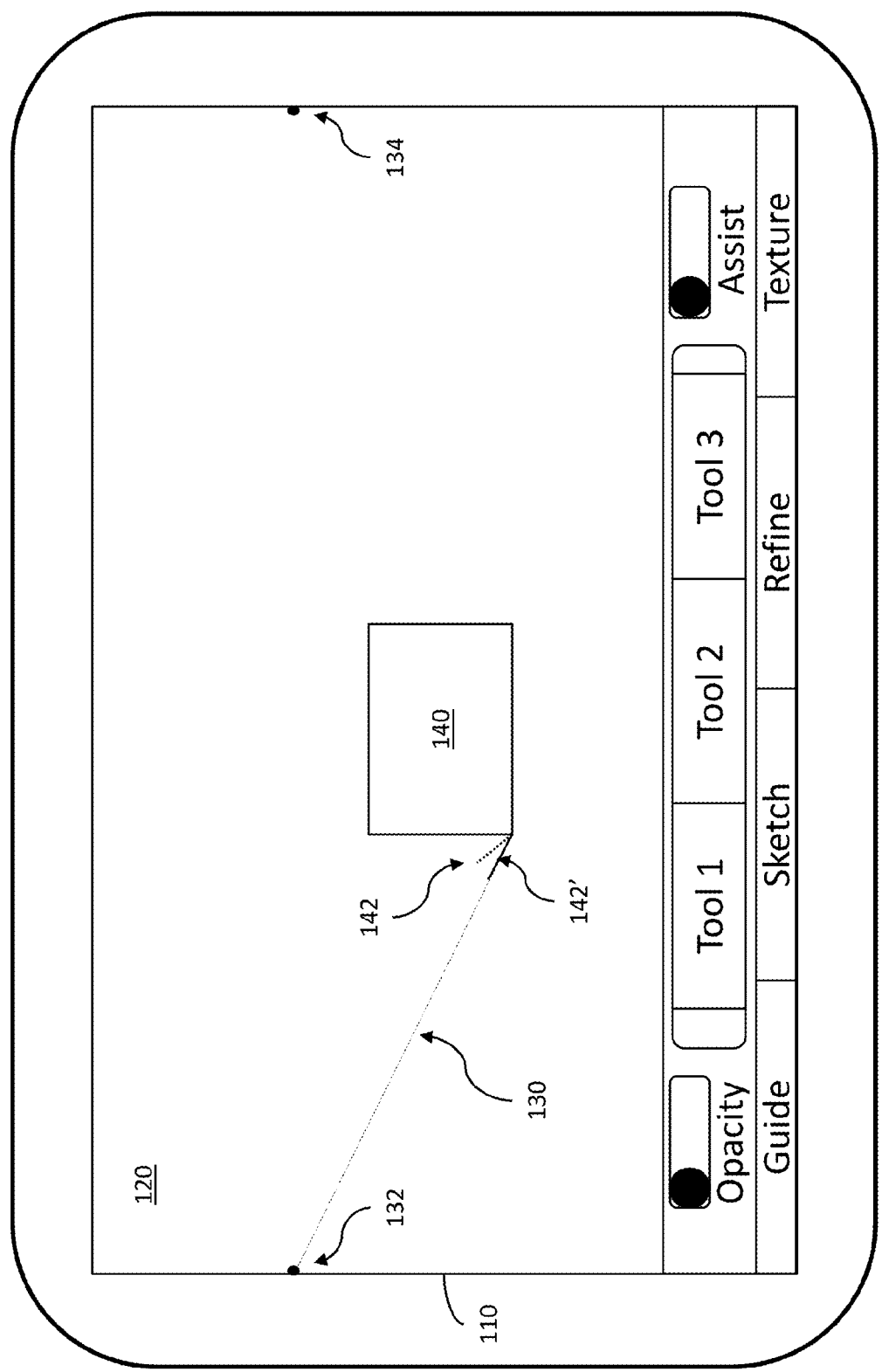
Figure 1E:
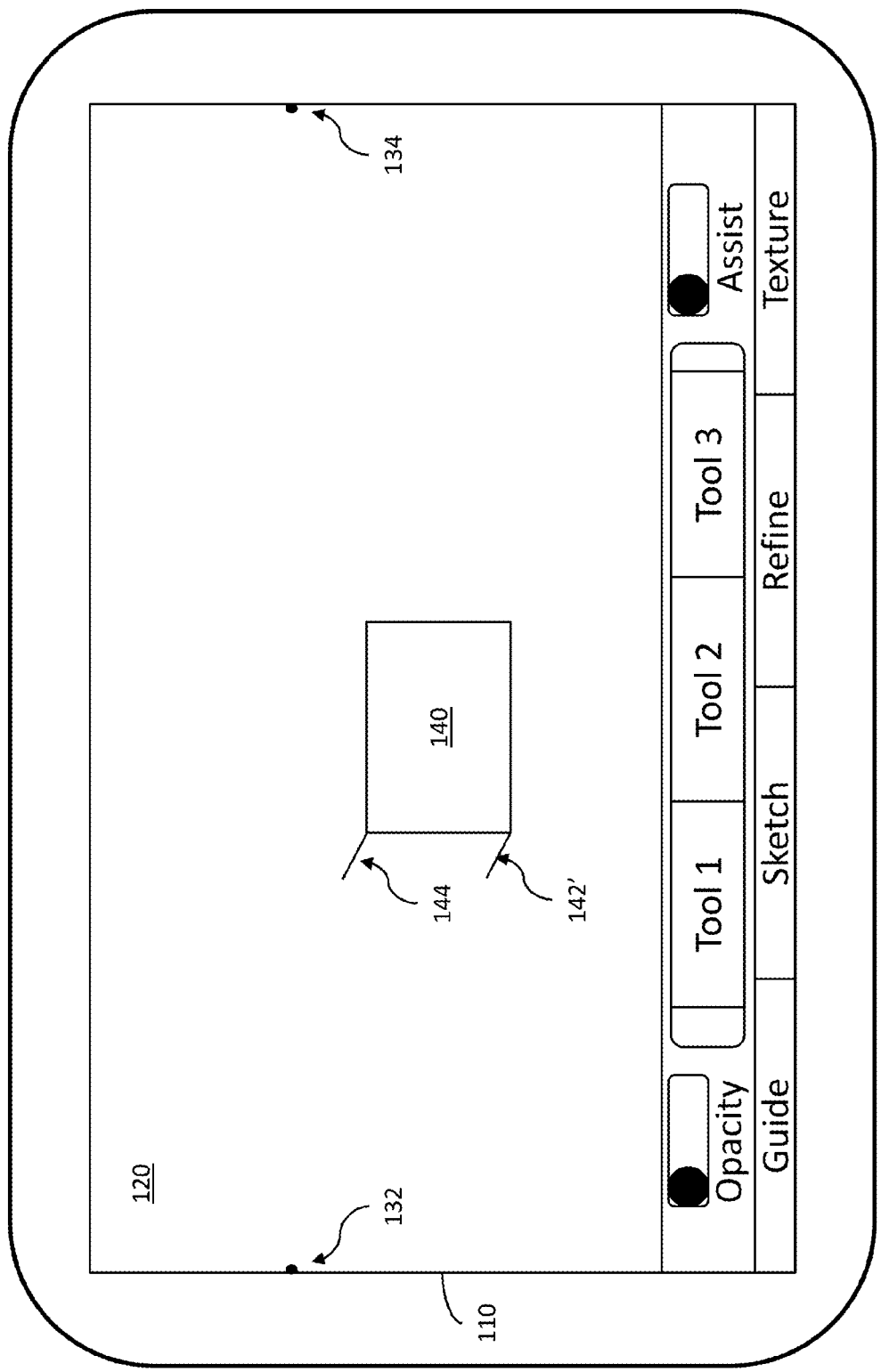

Once the perspective is set, the user begins to sketch lines on the drawing area 120 for the image she wishes to draw. For example, the user begins by sketching the outline of a building 140 in the drawing area 120. However, as the user draws the building 140, the drawing application determines that, as the user draws the various line segments, one line segment 142 does not conform to the perspective of the drawing. Thus, the drawing program adjusts the line segment 142 to more closely conform, or to exactly conform, to the perspective. As can be seen in FIG. 1D, the original line segment 142 has been adjusted to create the adjusted line segment 142' that follows the line of perspective 130, which is not actually visible to the user in this embodiment.

Figure 1F:
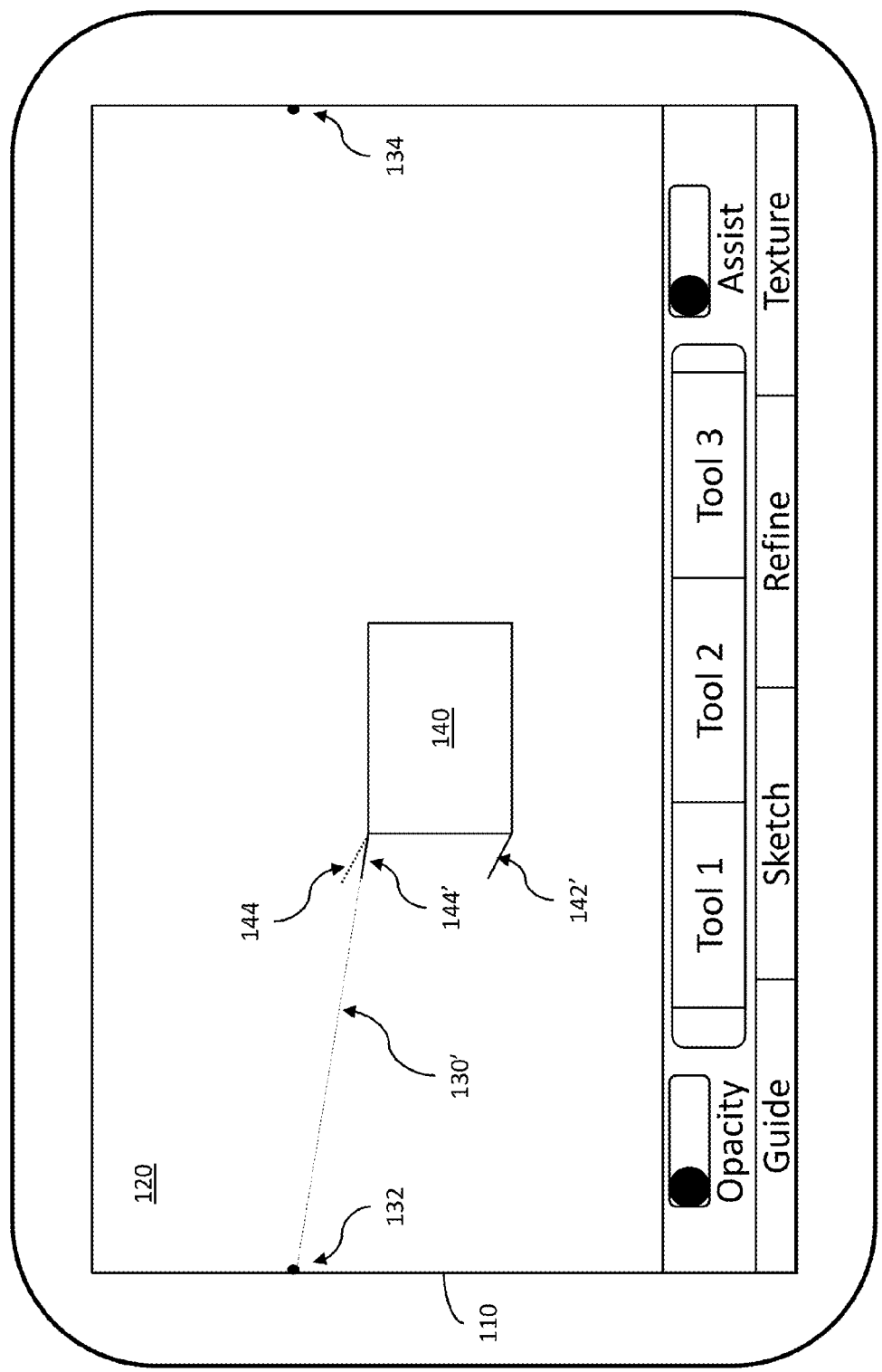

The user then draws another line segment 144 as a part of the building, but again does not correctly account for the drawing's perspective. Again, the drawing program adjusts the second line segment 144 to more closely conform to the perspective. As can be seen in FIG. 1F, the second line segment 144 has been adjusted to create adjusted line segment 144', which conforms to the line of perspective 130' in the drawing, which, like line of perspective 130, is also not visible to the user in this embodiment.

Figure 1G:
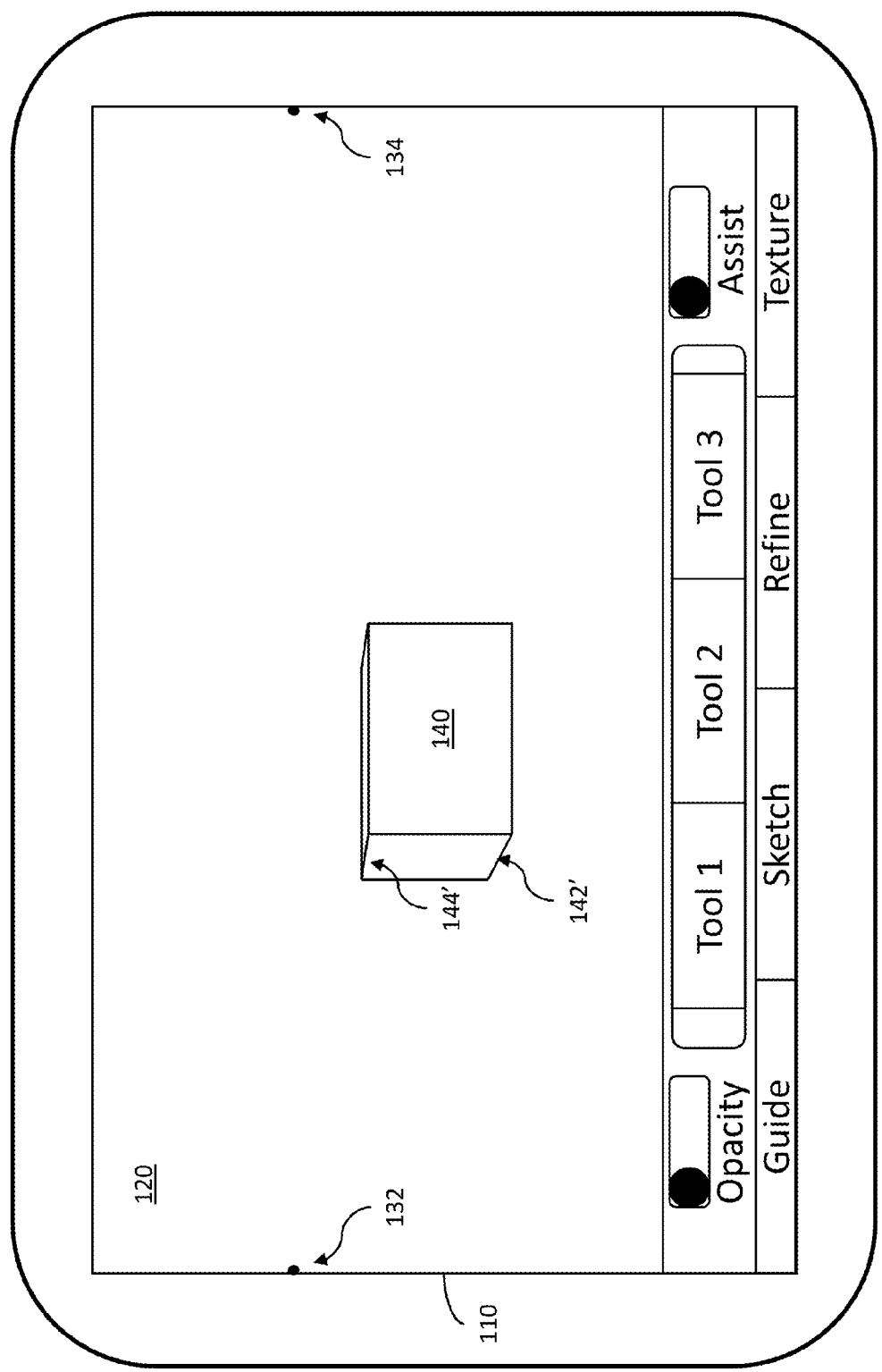

The user may then continue to sketch the building 140, receiving assistance from the drawing program as appropriate, until they user is satisfied with the result, such as the completed building shown in FIG. 1G. In this illustrative embodiment, the drawing program has provided a significant amount of assistance to the user by completely correcting original line segments 142', 144' to exactly align them along the proper perspective; however, as will be discussed in more detail below, the amount of computer assistance may be varied and, in some cases, when a user is quickly sketching a scene, multiple short strokes may be used to generally represent a feature, such as an edge of a wall, each of which may be adjusted to some degree to more closely conform to the preset perspective for the drawing, but not necessarily exactly following a line of perspective.

After the user has sketched the initial version of the building 144', the drawing program allows the user to save the initial sketch as a layer of the final image and allows the user to move to a new layer to refine the drawing. In the refine mode, the user may apply darker, truer lines by tracing over the sketched lines from the previous layer. These sketched lines are displayed faintly so as not to be distracting, but to provide guidance for the refinement process. The user may use the refinement process to generate a layer that more closely resembles what the finished image will look like. Again, computer assistance is provided during the refinement process and the refined drawing may be saved as a second layer. Finally, the user may apply shadings or textures to the drawing, which also may be saved separately as a separate layer of the drawing.

Once the user has completed the drawing to her satisfaction, the final image may be saved for later viewing. In this embodiment, the final image includes each of the layers created during the editing process, though only certain layers are displayed. But, in some cases, the user may only wish to save the layers actually displayed in the finished drawing.

This illustrative example is given to introduce the reader to the general subject matter discussed herein and this disclosure is not limited to this example. The following sections describe various additional non-limiting embodiments and examples of devices, systems, and methods for computer-assisted drawing.

Figure 2:
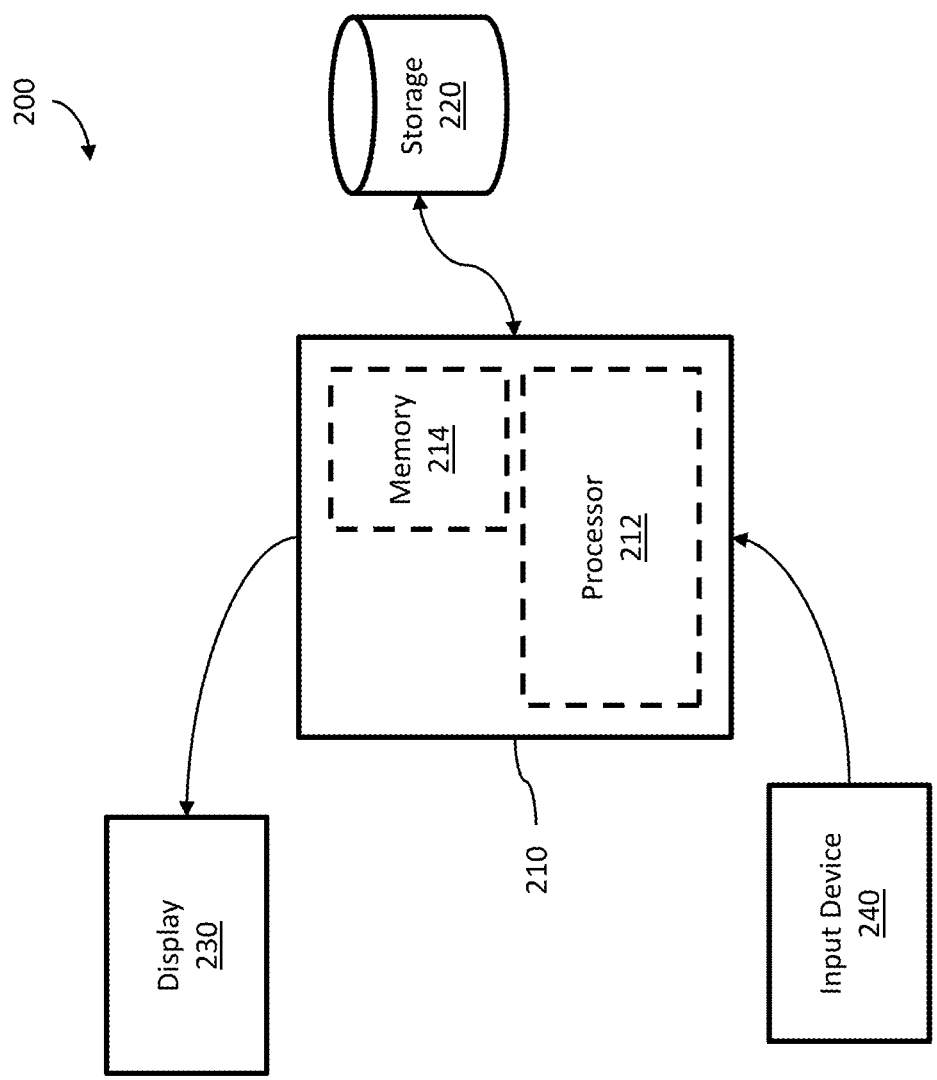
FIGS. 2-3 show illustrative systems for computer-assisted drawing according to various embodiments.

Referring now to FIG. 2, FIG. 2 shows a system 200 for computer-assisted drawing according to one embodiment of the present disclosure. The system 200 shown in FIG. 2 comprises a computer 210, which comprises a processor 212 and a memory 214, where the processor 212 is in communication with the memory 214. The computer 210 is in communication with a display 230 and an input device 240, as well as storage device 220.

In the embodiment shown in FIG. 2, the processor 212 is in communication with memory 214 and is configured to execute a software application that provides computer-assisted drawing functionality according to various embodiments. The software application may be stored within the memory 214 or in another memory, either local to or remote from the computer 210. The software application, as will be described in greater detail below, is configured to receive drawing information from the input device or processor and to provide display signals to the processor or the display.

In one embodiment, the input device 240 comprises a touch-sensitive input device. For example, in some embodiments the input device 240 comprises a touch-sensitive tablet. For example, in one embodiment, the input device 240 may comprise a touch-sensitive tablet and a corresponding stylus. In one such embodiment, a user uses the stylus as a virtual pencil to draw on the touch-sensitive tablet. The touch-sensitive tablet generates one or more signals based on interactions with the stylus and provides those signals to the computer 210. The signals may include position information related to an interaction between the stylus and the touch-sensitive tablet, pressure or pseudo-pressure information related to the interaction, velocity or acceleration information related to the interaction, or other parameters associated with the interaction. In some embodiments, the touch-sensitive tablet may be responsive to contact with other objects, including a user's finger, or multiple substantially simultaneous contacts with one or more objects, such as multiple fingers.

In some embodiments, the touch-sensitive input device may be integrated into the computer 210. For example, in one embodiment, the computer 210 comprises a tablet computer, such as an Apple® iPad®, having a touch-sensitive input device overlaid on the tablet computer's display. In another embodiment, the computer 210 may comprise a laptop device with an integral display and a touch-sensitive input device overlaid on the display.

In some embodiments, the input device 240 may comprise other types of input devices, such as a computer mouse, a joystick, a stylus, or a camera (e.g. a video camera) that are coupled to or in communication with the computer 210.

Signals from the input device 240 may be transmitted to the computer via a communications bus, such as USB, FireWire, or other suitable communications interface. The processor 212 receives such signals and processes them to determine actions responsive to said signals. For example, if signals received from the input device comprise drawing signals, the processor 212 may receive the signals and provide information from the signals to the software application to generate one or more graphical objects based on the drawing signals. For example, the software application may generate one or more graphical lines based on the drawing signals. After determining an action responsive to the input signals, the processor 212 may generate and transmit display signals to the display 230 to render a graphical image. For example, as discussed above in the illustrative embodiment, a user may move her finger across a touch-sensitive input device 240 which generates and transmits one or more signals to the processor 212 based on the user's input. The processor 212 receives the signals and provides information from the signals to the software application, which generates a display signal based on the signals, in this case, generates a display signal comprising a line based on the input signals. The processor 212 then transmits the display signal to the display 230, which displays the line based on the display signal.

The processor 212 is also in communication with storage device 220, which is configured store data. In some embodiments, the storage device 220 comprises a non-volatile computer readable medium, such as a hard disk, coupled to or disposed within the computer. In some embodiments, the storage device 220 is remote from the computer 210, such as a network-connected hard disk or a remote database system. In some embodiments, the processor 212 is configured to generate a file to store data, such as data received from the input device 240, in the storage device 220.

Figure 3:
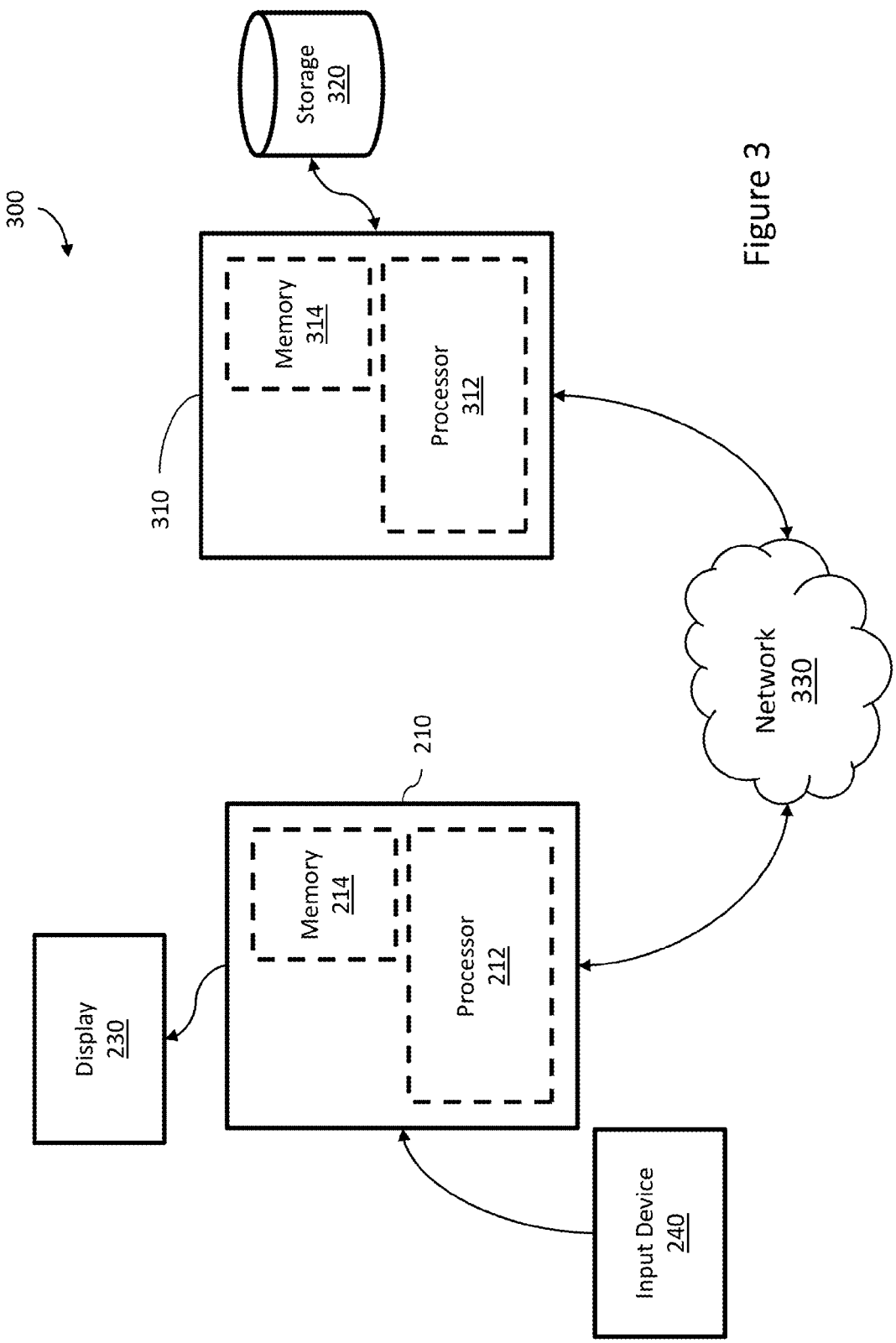

Referring now to FIG. 3, FIG. 3 shows a system 300 for computer-assisted drawing according to one embodiment of the present disclosure. The system 300 shown in FIG. 3 comprises a computer 210, which comprises a processor 212 and a memory 214, where the processor 212 is in communication with the memory 214. The computer 210 is in communication with a display 230 and an input device 240. In addition, the computer 210 is in communication with second computer 310 via network 330. In the embodiment shown in FIG. 3, the second computer 310 comprises a processor 312 and a computer-readable medium 314, and is in communication with storage device 330.

In the embodiment shown in FIG. 3, client computer 210 is configured to execute a front end for a software application for computer-assisted drawing and the remote computer 310 is configured to execute processing for the software application for computer-assisted drawing. For example, the client computer 210 receives input signals from the input device and transmit a signal to the second computer 310 based on the input signals. The processor 312 in the second computer is configured to receive the input signals and to determine actions responsive to the input signals. The second processor 312 then generates one or more signals to transmit to the first computer 210 based on the determined actions. The processor 212 at the first computer 210 receives the signals from the second computer 310 and generates one or more display signals based on the signals from the second computer 310. The processor 212 then transmits the display signals to the display 230, which displays one or more images based on the display signals.

Referring now to FIG. 4, FIG. 4 shows a method 400 for computer-assisted drawing according to one embodiment. The embodiment shown in FIG. 4 will be described with respect to the system 200 shown in FIG. 2, but is not restricted to use only on the system 200 of FIG. 2. Other embodiments according to this disclosure are suitable for performing the method 400 of FIG. 4, such as the system 300 shown in FIG. 3 as well as other systems within the scope of this disclosure.

The method 400 shown in FIG. 4 begins in block 401 when a new drawing is created. For example, a user executes a software application for computer-assisted drawing according to one embodiment. The software application presents a graphical user interface (GUI) to the user that includes one or more options and a workspace. The workspace is configured to provide an area in which the user may draw using the input device 240. The various options, which may include one or more menus, provides the option for the user to create a new drawing. For example, a new drawing may comprise a blank drawing. In some embodiments, a new drawing may be created from an existing drawing file, such as by loading a previous drawing or loading or importing another image file, such as a photograph. After the user has created the drawing for editing within the software application, the method proceeds to block 402.

In block 402, a perspective is determined for the drawing. An artist may select a perspective for the scene, such as a two-point perspective. In this embodiment, the processor based on a user input configured to define the perspective for the new drawing. For example, the user may define the perspective by selecting two points on opposite edges of the new drawing, such as may be seen in FIG. 1B, to define two vanishing points. In other embodiments, perspectives may be defined in different ways. For example, embodiments according to this disclosure may allow the processor to determine perspective based on one or more points input by a user. In some embodiments, the user may define a perspective that does not include a vanishing point, which may be referred to as "zero-point perspective."

In some embodiments, the processor 212 may determine a perspective based on information other than user input or in conjunction with user input. For example, in one embodiment, the processor 212 may analyze an image, such as a digitized photograph, to determine a perspective based on the photograph. For example, according to one embodiment, a user wishes to draw an image based on a photograph they have taken of the Empire State Building. The user may execute a software application for computer-assisted drawing on a suitable system, such as the system 200 shown in FIG. 2, and import the photograph into the drawing application. To import the photograph, the user may select a menu option in the GUI of the software application to import or open a file comprising the photograph. The drawing application reads data in the file to interpret image data for the photograph, and displays the photograph in a work area of the GUI. The application also analyzes portions of the image, such as objects within the image, to automatically identify a perspective based on the imported image.

In some embodiments, the user may provide input into such an automated process, such as by selecting a preferred perspective type, such as a two-point perspective, or by identifying one or more perspective points. For example, in one embodiment, a drawing application may automatically determine a number of possible perspective points but request assistance in selecting the correct points. Thus, the drawing application may display one or more candidate perspective points and allow the user to select one or more of the candidate perspective points. Once the perspective point(s) have been selected, the software application may determine the perspective for the image. After the perspective has been determined, the method 400 proceeds to step 404.

In block 404, the processor 212 receives a drawing input. As discussed above, a number of different input devices may be employed in various embodiments, such as touch-sensitive input devices, mice, styluses, etc. In one embodiment, the system 200 comprises a computer 210 in communication with a touch-sensitive drawing tablet input device 240. As discussed above, the processor 212 executes a computer-assisted drawing software application, which is configured to receive information from input signals from the drawing tablet 240 via the processor 212. As the user interacts with the drawing tablet 240, she touches the drawing tablet 240, such as with a stylus, and draws lines or shapes as though she were drawing on a piece of paper. The drawing tablet 240 generates one or more input signals that are transmitted to the processor 212 which provides information from the drawing signals to the software application. After a drawing input has been received, the method proceeds to block 406.

In block 406, a line segment is generated based on the received drawing input. For example, as was discussed above, the processor 212 provides information based on signals received from the drawing tablet 240. The software application then interprets the information to generate one or more line segments for the drawing image. After the line segment has been generated, the method proceeds to block 408.

In block 408, the software application causes the new line segment to be displayed on the display 230. In some embodiments, blocks 404-408 may occur substantially simultaneously or in different orders. For example, as a user draws a line segment on the drawing tablet, the software application may update the display to show the line segment as it is being drawn. After the user completes the line segment, such as by lifting a stylus from the drawing tablet, the software application may determine a line segment based on the received input, even though the drawing input has already been shown on the display 230. After displaying the line segment, the method 400 proceeds to block 410.

In block 410, the software application determines whether the line segment conforms to the defined perspective. As the new line segments are added to the drawing, the software application analyzes each line segment and determines whether the line segment conforms to the perspective for the drawing. If the line segment substantially conforms to the perspective, the software application may not adjust the line segment and the method returns to block 404 to receive additional drawing inputs. However, if the user has drawn a line segment that deviates substantially from the defined perspective, the software application may adjust the line segment to conform, or more closely conform, to the defined perspective. For example, as was discussed above with respect to FIGS. 1A-G, a user may draw an object, such as a building, that includes one or more line segments that should correspond with the defined perspective, such as walls of the building that recede into the distance. The drawing application identifies line segments that should conform to the defined perspective, such as by identifying objects in the drawing and mapping them against the defined perspective. As new line segments are added to the objects, the software application determines whether the new segments should follow lines of perspective. If the software application determines that a new line segment should conform to the defined perspective, the software application determines a conformance to the defined perspective, such as by determining an angle of incidence between the line segment and a hypothetical line of perspective originating at one of the line segments endpoints. For example, a hypothetical line of perspective may be generated beginning at one of the end points of the line segment and extended for a distance corresponding to the correct perspective. An angle of incidence between the hypothetical line of perspective and the line segment may be determined using trigonometry based on a distance between the hypothetical line of perspective and the line segment at some point along the hypothetical line of perspective. If the angle of incidence exceeds a threshold, the software application may adjust the line segment to more closely conform to the defined perspective.

In some embodiments, the software application may allow a user to define multiple perspective points for a single drawing, such as in the case of a two-point perspective. In one such embodiment, the software application determines which perspective point and corresponding line of perspective is the best fit for the new line segment. In this embodiment, the software application generates hypothetical lines of perspective for each perspective point. To generate a hypothetical line of perspective, the software application selects one endpoint of the line segment and creates a hypothetical line of perspective running from the selected end point to one of the lines of perspective. This process is repeated for each perspective point. An angle of incidence between the line segment and each hypothetical line of perspective is calculated and the hypothetical line of perspective for which the angle of incidence is lowest is selected for adjusting the line segment.

In some embodiments, one or more of the angles of incidence may be compared to a threshold. In one such embodiment, if each of the angles of incidence exceeds the threshold, the software application determines that the deviation from perspective was intentional and does not modify the line segment. In some embodiments, the threshold may be selected or adjusted by the user.

In some embodiments, a direction of travel of a line segment may be considered when selecting a hypothetical line of perspective. For example, in one embodiment, if a line is drawn such that the starting point of the line is closer to a first point of perspective than the ending point, the software application may determine that the first point of perspective should not be considered when potential modifications to the line segment are analyzed. In some embodiments, however, a direction of travel of the line segment may be ignored if the angle of incidence between the line segment and a hypothetical line of perspective to a perspective point is sufficiently small.

In some embodiments, the modifications or adjustments to a line segment may be applied after the line segment has been completed. However, in some embodiments, the application may provide feedback as a line segment is being drawn. For example, in one embodiment, as the user draws a new line segment, the application may display a proposed reinterpretation of the line segment as it is being drawn, such as, for example, by adjusting portions of the line segment or by displaying a portion of a second line segment corresponding to the defined perspective. In such an embodiment, the user may be provided with an indication that the adjustments to the line segment being drawn, or the proposed second line segment, are proposed modifications, such as by displaying the modified line segment in a different color, or by showing the drawn portions of the original line segments in a different color, or as slightly faded, to indicate that a change is being made, or being proposed, for the line segment being drawn. In some embodiments, the user may be provided with the option to decline a proposed modification to a line segment, such as by pressing a key or key combination to cancel the modification, or by performing a gesture on a touch-sensitive input device indicating that the modification should not be applied.

The software application may adjust a line segment in a variety of ways. For example, the amount of adjustment may vary depending on a user preference. In one embodiment, a user may adjust a variable setting that specifies a tolerance for non-conformance to a defined perspective. The user may select a tolerance within a range of tolerances from 0 to 10, with a strict tolerance at one end (e.g. 0) and a very loose tolerance (e.g. 10) at the other end of the range. If the user selects a strict tolerance, the software application may adjust the new line segment to be exactly or substantially exactly parallel to the hypothetical line of perspective. If the user selects a loose tolerance, the software application may only adjust the line segment if the angle of incidence is greater than 10 degrees and then may only adjust the line segment by reducing the angle of incidence by ½ or ⅓. For example, if the line segment had an angle of incidence of 12 degrees from the hypothetical line of perspective, the software application may adjust the line segment to have an angle of incidence of 6 degrees, or 4 degrees. Further, as one of skill in the art understands, during a sketching process, a user may draw multiple lines that generally define a single feature of an object, such as an edge of a wall. At a later time, the multiple lines may be replaced by a single inked, final line. However, during the sketching process, the rough outline of the object may be sufficient to provide the initial shape of the object. In such a scenario, it may be desirable to only slightly adjust such sketch lines. Thus, a user may select a more tolerant setting for perspective adjustment that will slightly adjust each of the sketch lines, without merging all of the sketch lines onto a single exact line of perspective.

In addition, as is understood in the art, a line segment may be not straight. To adjust a line segment, as has been discussed previously, an orientation of the line segment may be adjusted. In some embodiments, a shape of the line segment may be adjusted in addition to, or instead of, the orientation of the line segment. For example, if a user draws a line segment that partially defines a wall of a building, but the line segment is curved, the software application may analyze a slope of a line defined by the endpoints of the line segment. For example, the application may calculate a hypothetical straight line running from one end point of the line segment to the other end point. The application may then adjust the orientation of the line segment based on such an analysis, and may also reduce the amount of curvature in the line segment based on the hypothetical straight line segment that connects the end points of the drawn line segment.

For example, the application may constrain the amount of curvature of the line segment by imposing a maximum deviation from the hypothetical straight line. The application may then determine a curvature of the line segment and a maximum deviation from the hypothetical straight line and, while substantially retaining the curvature of the line segment, reduce the deviation from the hypothetical straight line. However, in some embodiments, the application may not adjust the shape of the line segment at all and thus may only change the orientation of the line segment, such as by moving one or both end points of the line segment to more closely correspond to a line of perspective. Further, in some embodiments, the application may replace a curved line segment with a straight line segment, such as by replacing points between the line segment's endpoints with new points corresponding to a straight line between the two end points.

As discussed previously with respect to the orientation of the line segment, a user may select a level of tolerance for such curved line segments. For example, in one embodiment, a user may select a tolerance for line curvature within a range of tolerances from 0 to 10, with a strict tolerance at one end (e.g. 0) and a very loose tolerance (e.g. 10) at the other end of the range. If the strictest tolerance is selected, line curvature may be completely eliminated and the software application may replace the drawn line segment with a straight line between the two endpoints of the drawn line segment. If the strictest tolerance is also selected for the line segment's conformance to the defined perspective, the line segment may be adjusted to exactly conform to the defined perspective. Thus, in such a scenario, the software application may adjust a curved line segment to become a straight line segment that exactly conforms, or nearly exactly conforms, to the defined perspective. In some embodiments, less strict tolerances may be employed that slightly adjust a line segment's conformance to the defined perspective and slightly adjust the curvature of drawn line segments.

Further, as will be discussed in greater detail below, software applications according to embodiments may allow a user to create a drawing by creating layers within the same drawing, where subsequent layers correspond to successively more refined versions of the same drawn image. In some embodiments, different layers may comprise different tolerances for conformance to perspective and for curvature of line segments. For example, in one embodiment, the initial layer, which corresponds to the initial rough sketch of a drawing, may have very loose tolerances for line segments with respect to conformance to perspective and curvature, while a final layer may have very strict tolerances for conformance to perspective and line segment curvature. After the software application adjusts the line segment, the method proceeds to block 414.

In block 414, the software application displays the adjusted line segment. For example, in one embodiment, the software application replaces the drawn line segment with the adjusted line segment. In one embodiment, the software application generates a new layer for the drawing where the new layer comprises the adjusted line segment while the original layer includes the unadjusted line segment. The two layers may be shown overlapping such that the user may see the differences between the original drawn line segment and the adjusted line segment, or only one of the layers may be shown, such as the new layer having the adjusted line segments. In some embodiments, the software application may allow the user to switch between the originally-drawn line segments and the adjusted line segments to determine how drawing inputs are being modified and may allow the user to adjust or improve his drawing technique based on the modifications. After the adjusted line segment is displayed, the method returns to block 404 to receive additional drawing inputs.

In some embodiments, the method 400 shown in FIG. 4 may correspond to method steps for a single layer in a drawing that may be repeated as desired for such a layer. In embodiments where a drawing may comprise a plurality of layers, the method 400 of FIG. 4 may be applied to one or more of the plurality of layers. Further, such functionality may be enabled or disabled for each layer according to a user preference or automatically based on the type of layer that is being edited. For example, in one embodiment, a layer may comprise a shading or texturing layer. For such a layer, the method 400 of FIG. 4 may be disabled, though in some embodiments, it may be desirable to conform shading or texturing to a defined perspective.

While the method 400 shown in FIG. 4 does not explicitly show transitions from certain blocks to other blocks, such transitions are contemplated and encompassed within this disclosure. For example, a user may iterate through blocks 404-414 to create and refine a drawing, while saving the drawing multiple times during the process. In addition, after editing the drawing, the user may desire to change the perspective of the drawing, such as by moving one or more points that define the perspective of the drawing. To allow such functionality, the software may store information corresponding to one or more line segments or other features that have been adjusted to conform to the originally-defined perspective. If the perspective is subsequently changed, the software may determine new adjustments for each of such line segments or features to allow them to be adjusted to the new perspective.

In some embodiments, if a perspective is changed after a drawing has been at least partially created, the changed perspective will not be applied retroactively, but instead, only line segments added following the change in perspective will be adjusted. However, in some embodiments, previously defined line segments may be adjusted to conform to the changed perspective. For example, in one embodiment, the application may generate a function to describe the change between the original perspective and the changed perspective and apply the function to existing line segments such that they conform to the changed perspective.

Referring now to FIG. 5, FIG. 5 shows a method for computer-assisted drawing according to one embodiment. The embodiment shown in FIG. 4 will be described with respect to the system 300 shown in FIG. 3, but is not restricted to use only on the system 300 of FIG. 3. Other embodiments according to this disclosure are suitable for performing the method 500 of FIG. 5, such as the system 200 shown in FIG. 2 as well as other systems within the scope of this disclosure. In addition, reference will also be made to the images shown in FIGS. 6A-G.

The method 500 shown in FIG. 5 begins in block 501 when a new drawing is created. For example, in one embodiment, a user executes a software application for computer-assisted drawing according to one embodiment. The software application presents a graphical user interface (GUI) to the user that includes one or more options and a workspace. In this embodiment, system 300 provides a remote computer 310 that executes portions of the software application for drawing, while the client computer 210 provides other portions of the drawing application, such as the GUI, thus reducing processing requirements on the client's computer 210. In this embodiment, the client computer 210 comprises a handheld tablet 210 that has a touch-sensitive display 240. The workspace is configured to provide an area in which the user may draw using the touch-sensitive display 240. The various options, which may include one or more menus, provide the option for the user to create a new drawing. For example, a new drawing may comprise a blank drawing. In some embodiments, a new drawing may be created from an existing drawing file, such as by loading a previous drawing or loading or importing another image file, such as a photograph. For example, the user may import the image shown in FIG. 6A. After the user has created the drawing for editing within the software application, the method proceeds to block 502.

In block 502, a perspective for the drawing is determined. As discussed above with respect to block 402 of the method 400 shown in FIG. 4, perspective may be determined in a variety of ways. Further, in the system 300 of FIG. 3, the user may enter perspective information into the GUI at the client computer 210, which may then be transmitted to the remote computer 310 to determine the perspective. In some embodiments, the client computer 210 may determine the perspective and provide the determined perspective to the remote computer 310. After the perspective has been determined, the method 500 proceeds to block 504.

In block 504, a layer for the drawing is selected and displayed. For example, if the user is creating a new drawing, a first layer for the drawing may be created. In an embodiment where the user is editing a previously-created drawing, the user may select an existing layer or may create a new layer for the drawing. In some embodiments, the software application may provide different types of layers. As will be described in more detail, one or more layers may be selected and displayed simultaneously, though in this embodiment, only one layer may be edited at a time. When displaying a layer, or multiple layers, in some embodiments, the software application for computer-assisted drawing may also display other useful information. For example, in one embodiment, the software application may display one or more grid lines based on the defined perspective. Such grid lines may assist a user when drawing lines that are intended to conform to the defined perspective.

Embodiments according to this disclosure may provide multiple layers within a single drawing, and may provide multiple different kinds of layers. For example, in one embodiment, a software application for computer-assisted drawing may provide freehand layers, refinement layers, shading layers, and inking layers. According to such an embodiment, a drawing may comprise one or more freehand layers. A freehand layer may provide for initial sketch drawing inputs for providing rough outlines for various objects within a drawing. One or more freehand layers may be used to allow the user to sketch different portions of the drawing independently, to provide different versions of the same drawing, or to allow for initial refinement of a drawing. In one embodiment, a software application for computer-assisted drawing may provide drawing tools for a freehand layer that generate lighter, thinner lines to allow for easy sketching of a drawing. For example, a freehand layer corresponding to the imported image of FIG. 6A may be seen in FIG. 6B.

In addition to freehand layers, refinement layers may be included within a drawing as well. For example, a refinement layer may comprise different drawing tools, such as different types of "pens" or "inks" to allow a user to overwrite initial sketch inputs with more refined drawing inputs. For example a box that is sketched with a number of different light sketch inputs may be refined with a fewer number of darker, more precise lines. For example, a refinement layer corresponding to the freehand layer of FIG. 6B may be seen in FIG. 6C. Similarly, inking layers may be provided that provide still more refined or "final" versions of initial sketches or intermediate refined versions of the initial sketch. For example, an inking layer corresponding to the refinement layer of FIG. 6C may be seen in FIG. 6D. In addition, shading layers may provide coloring, texturing, or other fill-type inputs for objects that have been drawn in other layers. For example, a shading layer may be seen in FIG. 6E. Finally, a final layer may be generated based on preceding layers. For example, the software application may combine information from one or more inking layers and one or more shading layers to generate a final drawing image layer. For example, a final drawing layer may be seen in FIG. 6F. While, in this embodiment, only a few types of illustrative layers have been described, additional types of layers may be provided as well, such as three-dimensional texturing layers, lighting layers, and others that are known to those of skill in the art.

Figure 6A:
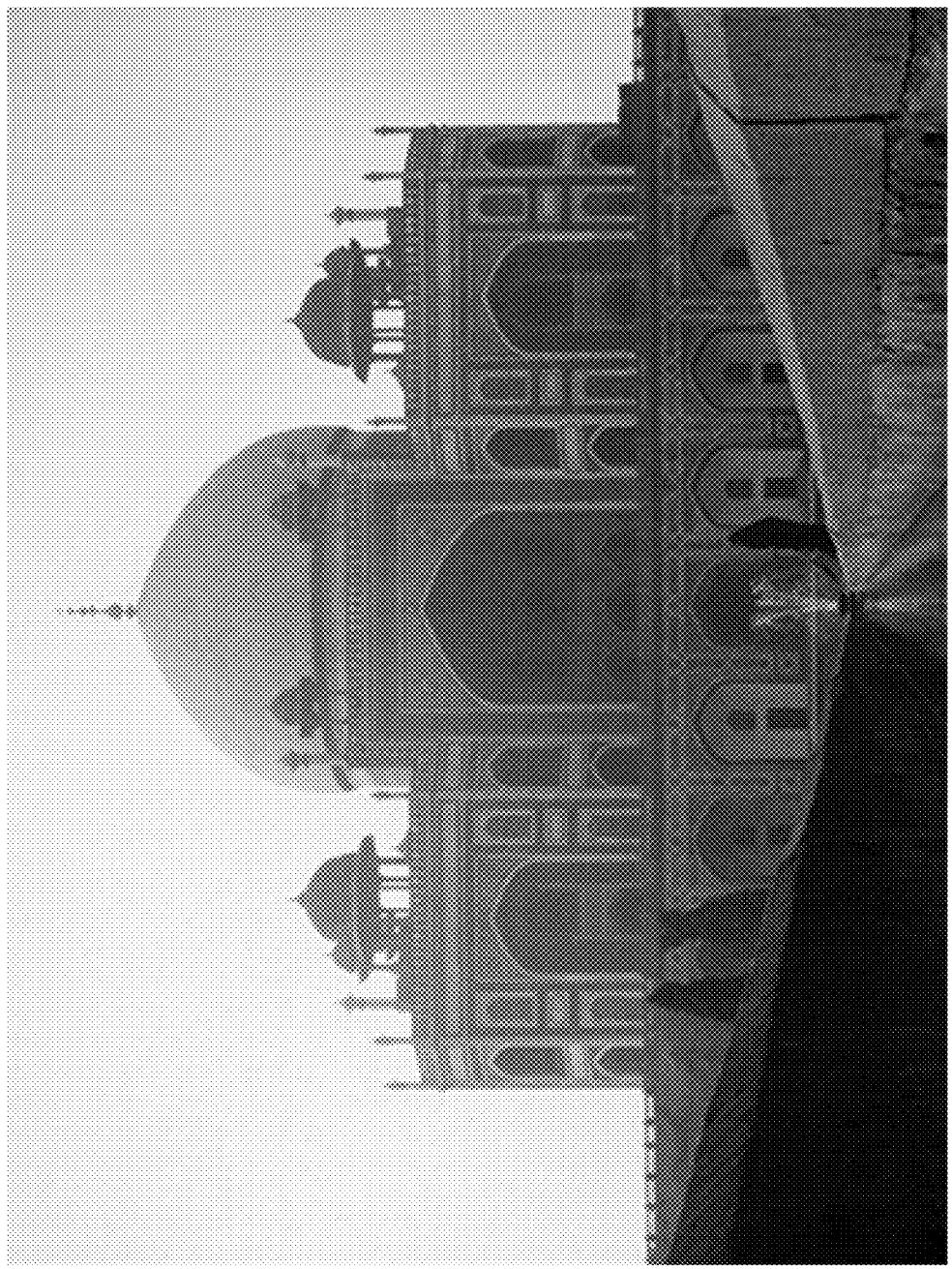
FIGS. 6A-G show illustrative images according to various embodiments.
Figure 6B:
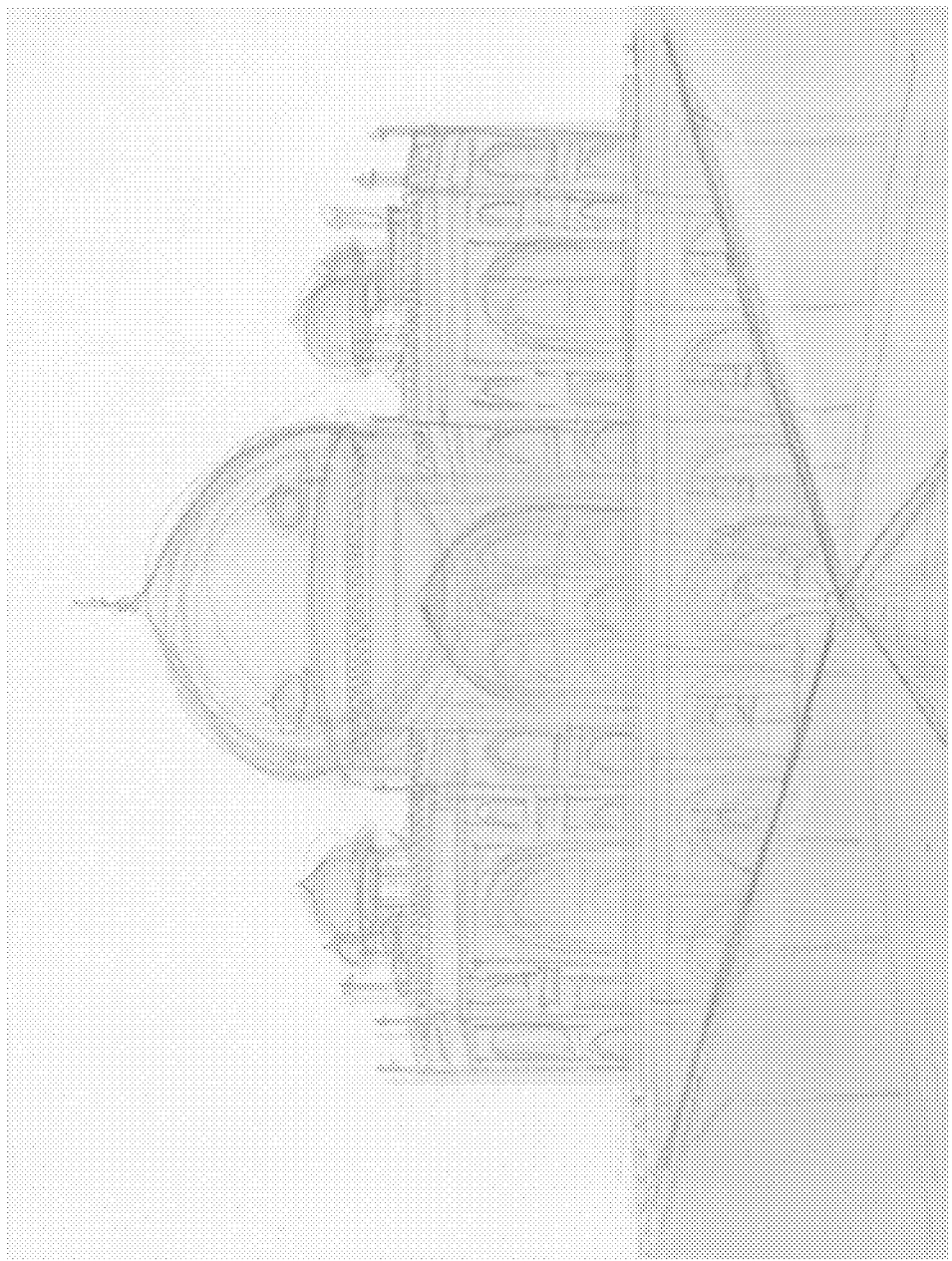
Figure 6C:
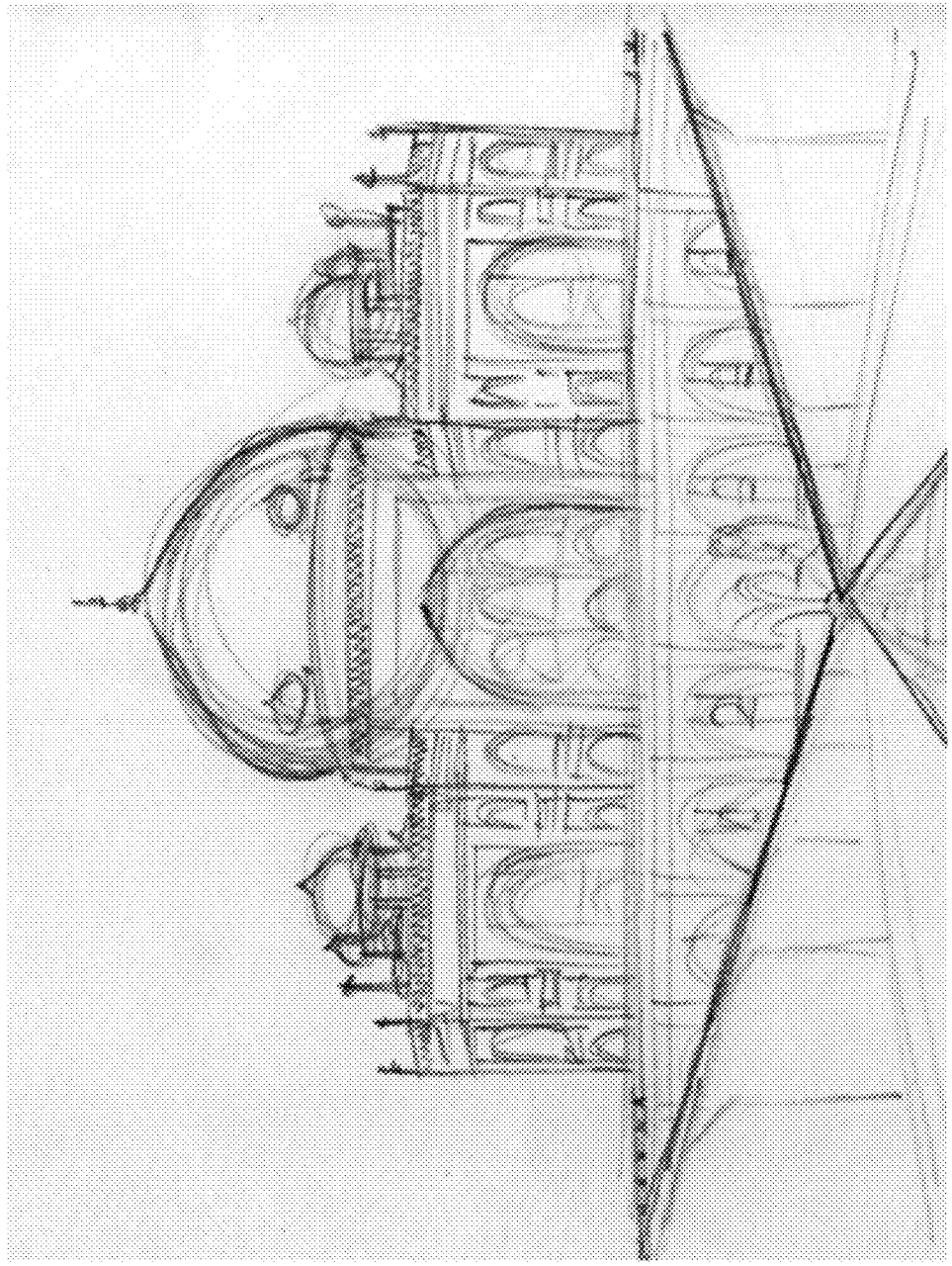
Figure 6D:
Figure 6E:
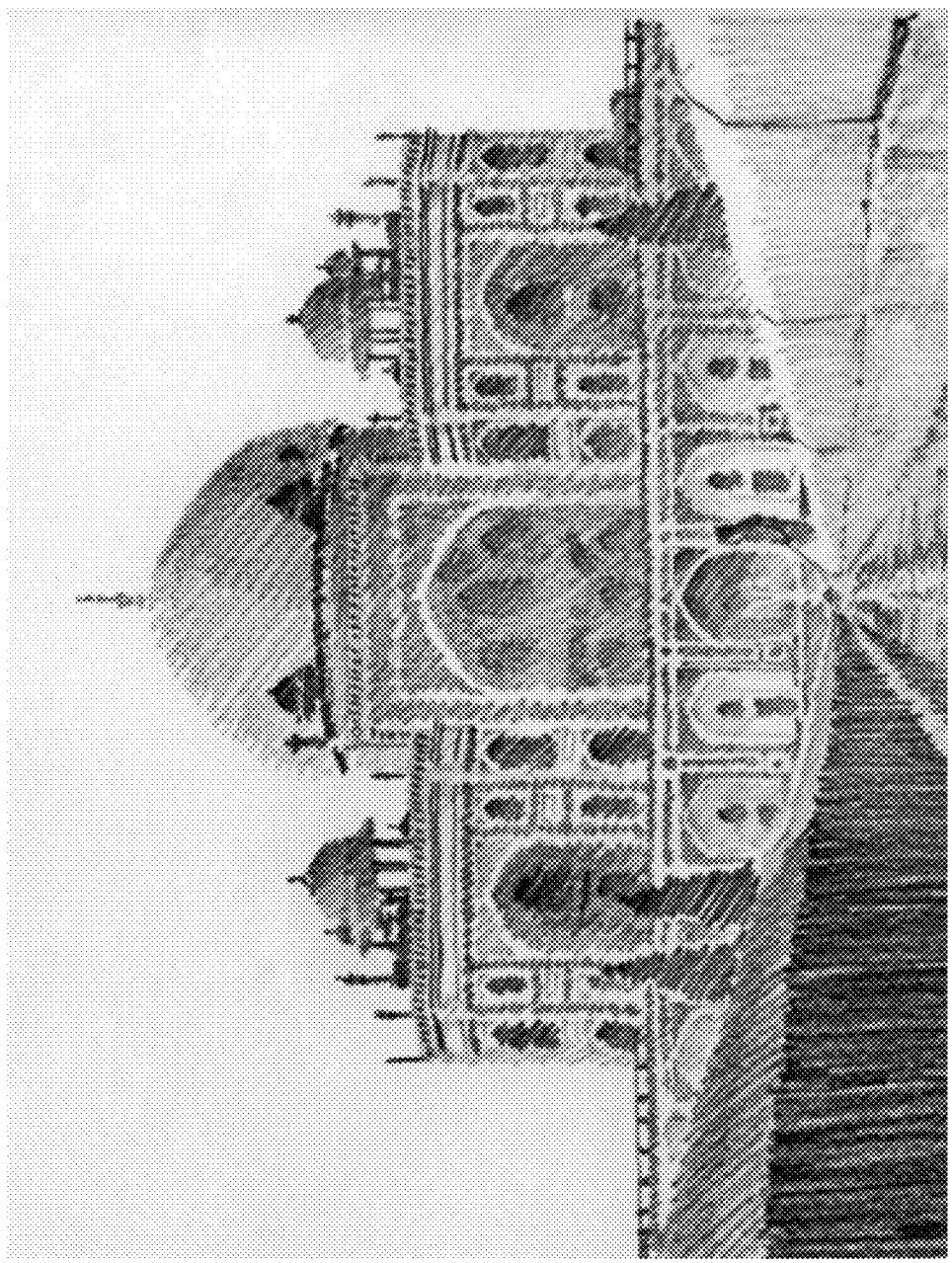
Figure 6F:
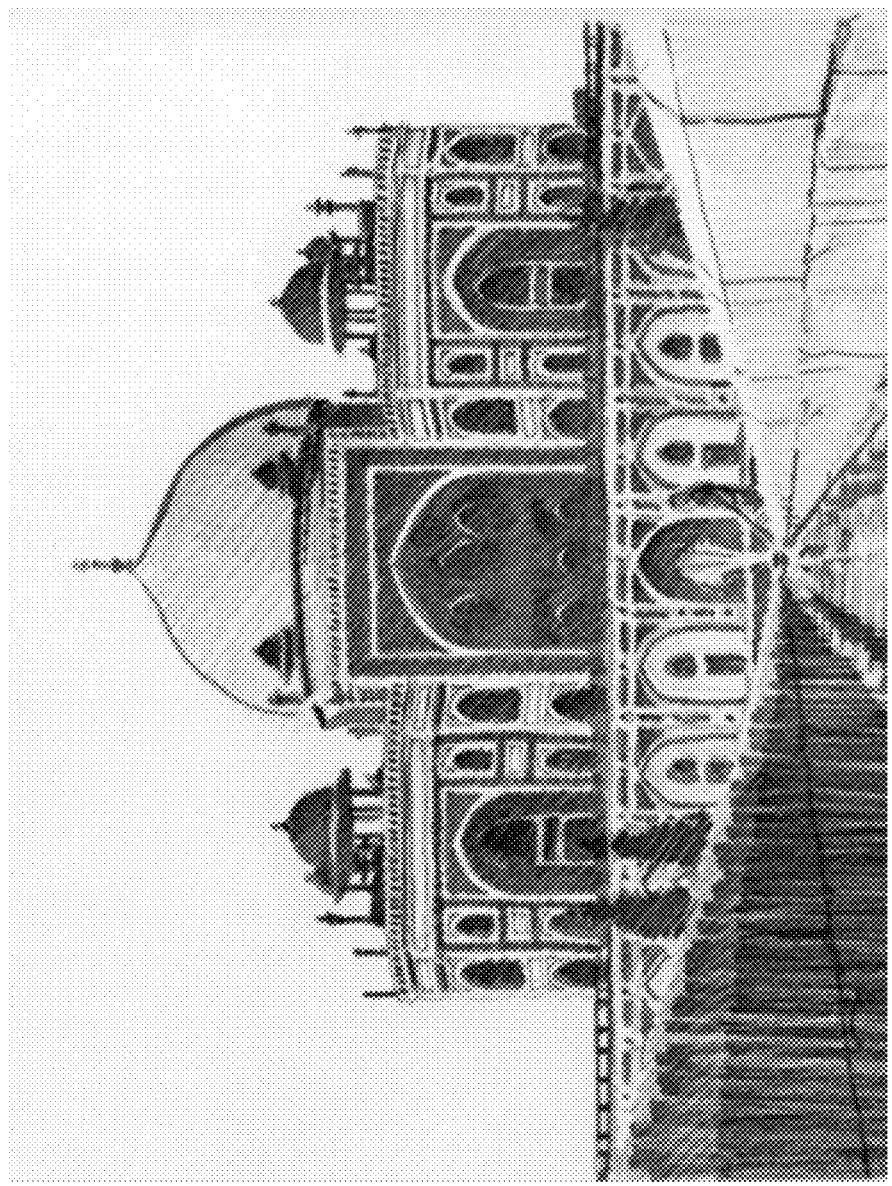
Figure 6G:
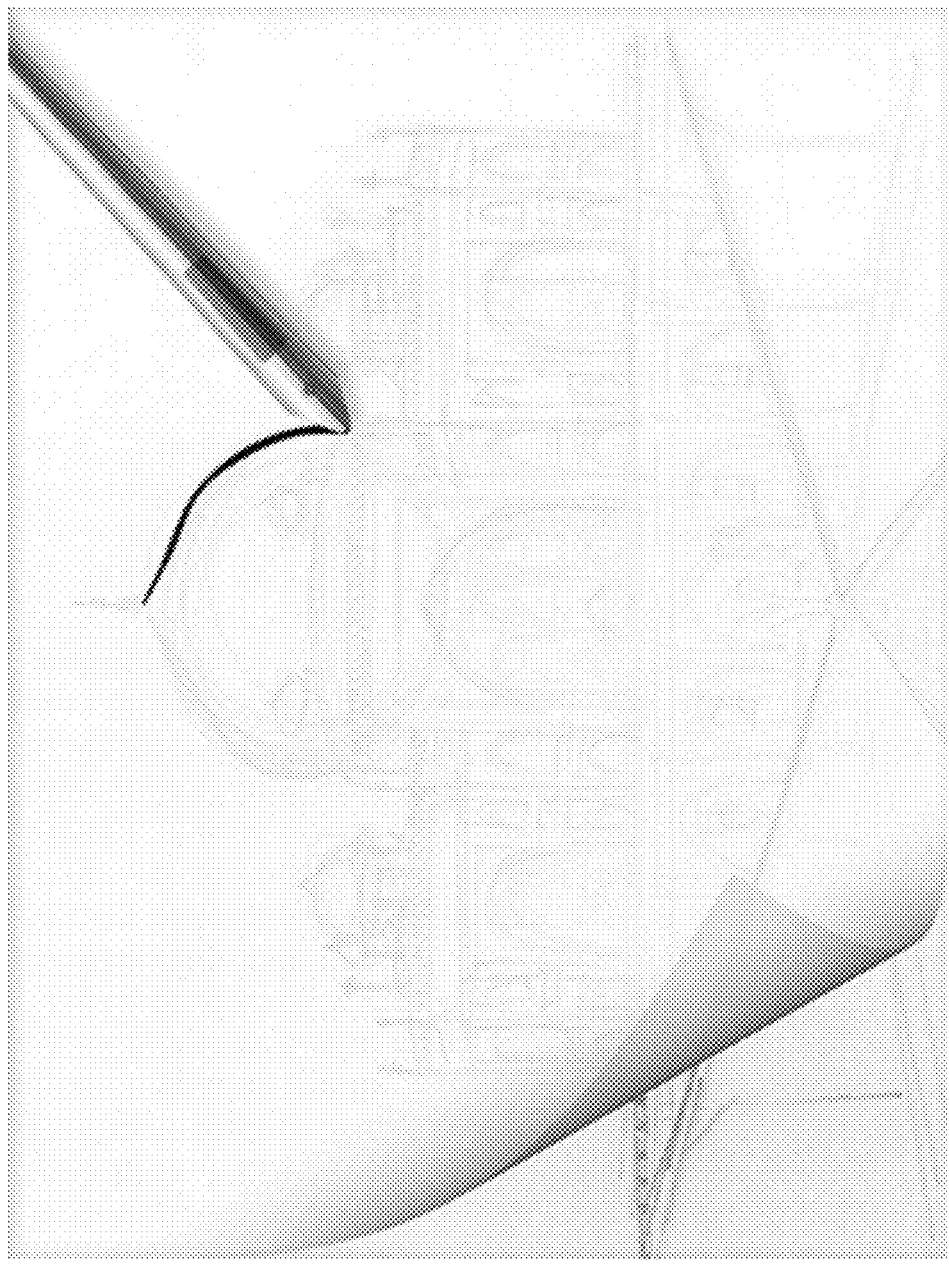

In this embodiment, the software application allows the user to select a layer for editing, such as an initial freehand sketch layer. In addition, the software application may allow the user to select other layers to be displayed. For example, in this embodiment, the user has imported the image shown in FIG. 6A to serve as the basis for the new drawing. The user may select a new freehand sketch layer for editing, and may select a base layer comprising the imported photograph. In this embodiment, the software application overlays the freehand sketching layer on top of the imported image so that as the user sketches, the sketch input is visible over the imported image. In some embodiments, the imported image may be made lightened or faded such that the user may see objects within the imported image, but the imported image is less obtrusive and allows the user to sketch without being distracted by the initial image or without making it difficult for the user to see the user's drawing inputs. Similarly, if a user selects a refinement layer for editing, the user may also select a freehand sketch layer to be visible to provide guidance for refinement layer drawing inputs. Again, the user may elect to have the freehand sketch layer to be faded or otherwise less obtrusive when editing the refinement layer. For example, FIG. 6G shows a conceptualization of the overlay of a refinement layer over the freehand sketch layer shown in FIG. 6B. After selecting and displaying the layer or layers, the method 500 proceeds to block 506.

In block 506, the software application receives drawing inputs from the input device 240. As discussed above, a number of different input devices may be employed in various embodiments, such as touch-sensitive input devices, mice, styluses, etc. In this embodiment, the tablet 210 receives inputs from a user, such as a user's finger or multiple fingers. The inputs are displayed on the tablet's display 230 and also transmitted to the remote computer 310. For example, as may be seen in FIG. 6B, the user may sketch a number of lines to define a number of objects in a drawing. The various sketched lines may be displayed on the display and also transmitted to the remote computer for further processing or saving.

In some embodiments, the software application may receive drawing inputs for a selected layer and generate drawing data useable in another layer. For example, in one embodiment, a user may create a pattern in a freehand sketch layer. The user may then select a portion of the pattern and store the portion to be subsequently used as a texture. Subsequently, the method may return to block 504 and a texture layer may be selected. The user may apply the user-defined texture in the texture layer by using conventional drawing inputs or by using other drawing commands, such as 'fill' commands. After receiving one or more drawing inputs, the method 500 proceeds to block 508.

In block 508, the drawing inputs are adjusted. As was discussed above with respect to the method 400 of FIG. 4, drawing inputs may be adjusted in a variety of ways. In this embodiment, the adjustment is performed by the remote computer 310 and communicated to the client computer 210. Such an embodiment may be advantageous where the client computer 210 has limited processing power and may serve as a front end for the drawing application that is executed on the remote computer 310. Some portions of the adjustment may be performed on the client computer, such as selection of tolerances or thresholds for conformance with a defined perspective, which may be transmitted to the remote computer. After the drawing inputs have been adjusted, the adjustments are communicated to the client computer 210, which updates the displayed drawing to show the adjusted image. After drawing inputs have been adjusted, the method 500 proceeds to block 510.

In block 510, the drawing is saved. For example, in one embodiment, the software application generates one or more files for storing the drawing generated within the application. As was discussed above, a drawing may comprise a plurality of layers. Thus in one embodiment, a drawing may be saved such that each layer is stored in a different file. In one such embodiment, each file may be separately viewable in an image viewer. For example, each layer may be stored as a separate bitmap image file and a further file is stored that comprises information describing the various layers within the drawing and how the various layers relate to each other. Such a file may be used by the software application at a subsequent time when the user wishes to load the layers of the drawing for further editing. In some embodiments, one or more of the layers may be stored in a single file. In some embodiments, a "final" image file may be generated that comprises only the "final" image layer of the drawing, instead of each of the layers. Such an embodiment may be desirable when the finished drawing is to be published, such as on a website, to reduce the total file size. Further, some embodiments may allow a user to save individual layers. Such an embodiment may be desirable in a number of settings. For example, in an educational setting, an art teacher may desire to provide only a layer with initial sketching lines to allow students to practice the refinement process from a common starting point. Subsequent layers may be provided later to allow the students to practice other techniques such as shading, texturing, or inking.

After a drawing has been saved in block 508, the method 500 may continue, such as by returning to any of blocks 501-508 to allow for creating a new drawing or further editing the existing drawing. Further, while the method 500 shown in FIG. 5 does not explicitly show transitions from certain blocks to other blocks, such transitions are contemplated and encompassed within this disclosure. For example, a user may iterate through blocks 504, 506, 508, and 510 to create and refine a drawing, while saving the drawing multiple times during the process.

General

While the methods and systems herein are described in terms of software executing on various machines, the methods and systems may also be implemented as specifically-configured hardware, such a field-programmable gate array (FPGA) specifically to execute the various methods. For example, referring again to FIGS. 2 and 3, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to "one embodiment" or "an embodiment" means that a particular feature, structure, operation, or other characteristic described in connection with the embodiment may be included in at least one implementation of the disclosure. The disclosure is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

The invention claimed is:

1. A computer-implemented method comprising:
   determining a perspective based on at least one perspective point;
   receiving a sketch drawing input and generating a sketch line segment based on the drawing input;
   determining, by a computing device, an angle of incidence of the sketch line segment to the perspective; and
   responsive to determining the angle of incidence exceeds a first user-adjustable threshold but does not exceed a second user-adjustable threshold:
      adjusting, by the computing device, the sketch line segment to partially reduce the angle of incidence by a proper fractional portion of the angle of incidence, and
      displaying the adjusted sketch line segment.

2. The method of claim 1, further comprising receiving an image, and wherein determining the perspective is based on the image.

3. The method of claim 1, further comprising displaying a perspective grid based on the perspective.

4. The method of claim 1, further comprising:
   receiving a refinement drawing input and generating a refinement line segment based on the refinement drawing input, the refinement drawing input based on the adjusted sketch line segment;
   determining a refinement conformance of the refinement line segment to the adjusted sketch line segment;
   adjusting the refinement line segment based on the refinement conformance; and
   displaying the adjusted refinement line segment.

5. The method of claim 4, further comprising:
receiving an inking drawing input and generating an inking line segment based on the inking drawing input, the inking drawing input based on the adjusted refinement line segment;
determining an inking conformance of the inking line segment to the adjusted refinement line segment;
adjusting the inking line segment based on the inking conformance; and
displaying the adjusted inking line segment.

6. The method of claim 1, further comprising:
receiving a texture selection; and
receiving a texture drawing input and displaying a texture based on the texture drawing input and the texture selection.

7. The method of claim 6, wherein receiving a texture selection comprises receiving drawing inputs and generating the texture selection based on the drawing inputs.

8. A method comprising:
determining a perspective based on at least one perspective point;
receiving sketch drawing inputs in a hand-sketch layer, and generating sketch line segments based on the sketch drawing inputs;
responsive to determining angles of incidence of the sketch line segments to the perspective exceed a first user-adjustable threshold but do not exceed a second user-adjustable threshold, adjusting the sketch line segments to partially reduce the angles of incidence by proper fractional portions of the angles of incidence;
receiving refinement drawing inputs in a refinement layer, and generating refinement line segments based on the refinement drawing inputs, the refinement drawing inputs based on the adjusted sketch line segments;
adjusting, by a computing device, the refinement line segments based on the adjusted line segments;
receiving inking drawing inputs in an inking layer, and generating inking line segments based on the inking drawing inputs, the inking drawing inputs based on the adjusted refinement line segments; and
adjusting, by the computing device, the inking line segments based on the refinement line segments.

9. The method of claim 8, further comprising saving the hand-sketch layer, the refinement layer, and the inking layer.

10. The method of claim 9, wherein the saving comprises saving each of the hand-sketch layer, the refinement layer, and the inking layer to the same file.

11. A non-transitory computer-readable medium comprising program code, the program code configured to cause a processor to execute a method, the program code comprising:
program code for determining a perspective based on at least one perspective point;
program code for receiving a sketch drawing input and generating a sketch line segment based on the drawing input;
program code for determining an angle of incidence of the sketch line segment to the perspective;
program code for, responsive to determining the angle of incidence of the sketch line segment to the perspective exceeds a first user-adjustable threshold but does not exceed a second user-adjustable threshold, adjusting the sketch line segment to partially reduce the angle of incidence by a proper fractional portion of the angle of incidence; and
program code for displaying the adjusted sketch line segment.

12. A non-transitory computer-readable medium comprising program code, the program code configured to cause a processor to execute a method, the program code comprising:
program code for determining a perspective based on at least one perspective point;
program code for receiving sketch drawing inputs in a hand-sketch layer, and generating sketch line segments based on the sketch drawing inputs;
program code for, responsive to determining angles of incidence of the sketch line segments to the perspective exceed a first user-adjustable threshold but do not exceed a second user-adjustable threshold, adjusting the sketch line segments to partially reduce the angles of incidence by proper fractional portions of the angles of incidence;
program code for receiving refinement drawing inputs in a refinement layer, and generating refinement line segments based on the refinement drawing inputs, the refinement drawing inputs based on the adjusted sketch line segments;
program code for adjusting the refinement line segments based on the adjusted line segments;
program code for receiving inking drawing inputs in an inking layer, and generating inking line segments based on the inking drawing inputs, the inking drawing inputs based on the adjusted refinement line segments; and
program code for adjusting the inking line segments based on the refinement line segments.

13. The non-transitory computer-readable medium of claim 12, further comprising program code for saving the hand-sketch layer, the refinement layer, and the inking layer.

14. The non-transitory computer-readable medium claim 13, wherein the program code for saving comprises program code for saving each of the hand-sketch layer, the refinement layer, and the inking layer to the same file.

15. A system comprising:
a memory; and
at least one processor in communication with the memory, the at least one processor configured to:
determine a perspective based on at least one perspective point;
receive a sketch drawing input and generate a sketch line segment based on the drawing input;
determine an angle of incidence of the sketch line segment to the perspective;
responsive to a determination that the angle of incidence of the sketch line segment to the perspective exceeds a first user-adjustable threshold but does not exceed a second user-adjustable threshold, adjust the sketch line segment to partially reduce the angle of incidence by a proper fractional portion of the angle of incidence; and
generate a display signal, the display signal comprising the adjusted sketch line segment.

16. The system of claim 15, wherein the at least one processor is further in communication with a touch-sensitive input device, the processor further configured to receive the sketch drawing input from the touch-sensitive input device.

17. The system of claim 15, wherein the at least one processor is in communication with a client processor, the at least one processor further configured to receive the sketch drawing input from the client processor and to transmit the display signal to the client processor.

18. The system of claim 15, wherein the at least one processor is further configured to receive an image and to determine the perspective based on the image.

19. The system of claim 15, wherein the at least one processor comprises a first processor and a second processor, wherein the first processor and second processor each execute a portion of the configured functionality.

20. A system comprising:
- a server comprising a processor and a memory, the processor in communication with the memory, the server configured to:
  - receive a connection from a client computer;
  - create a new drawing;
  - receive a perspective from the client computer;
  - receive drawing inputs from the client computer;
  - responsive to a determination of angles of incidence of one or more of the drawing inputs to the perspective exceed a first user-adjustable threshold but do not exceed a second user-adjustable threshold:
    - adjust the one or more drawing inputs to partially reduce one of the angles of incidence by a proper fractional portion of the one of the angles of incidence to create adjusted drawing data; and
  - provide the adjusted drawing data to the client computer.

21. The system of claim 20, wherein the server is further configured to receive a save command from the client computer and to store at least a portion of the drawing inputs and the adjusted drawing data in response to receiving the save command.

* * * * *

UNITED STATES PATENT AND TRADEMARK OFFICE
CERTIFICATE OF CORRECTION

| | | |
|---|---|---|
| PATENT NO. | : 9,035,953 B1 | Page 1 of 1 |
| APPLICATION NO. | : 13/524787 | |
| DATED | : May 19, 2015 | |
| INVENTOR(S) | : Kukulski et al. | |

It is certified that error appears in the above-identified patent and that said Letters Patent is hereby corrected as shown below:

In the Claims

Column 16, Claim 14, Line 33 after the word "medium" and before the word "claim"

Insert --of--

Signed and Sealed this
Twenty-second Day of September, 2015

Michelle K. Lee
*Director of the United States Patent and Trademark Office*